Figure 1:
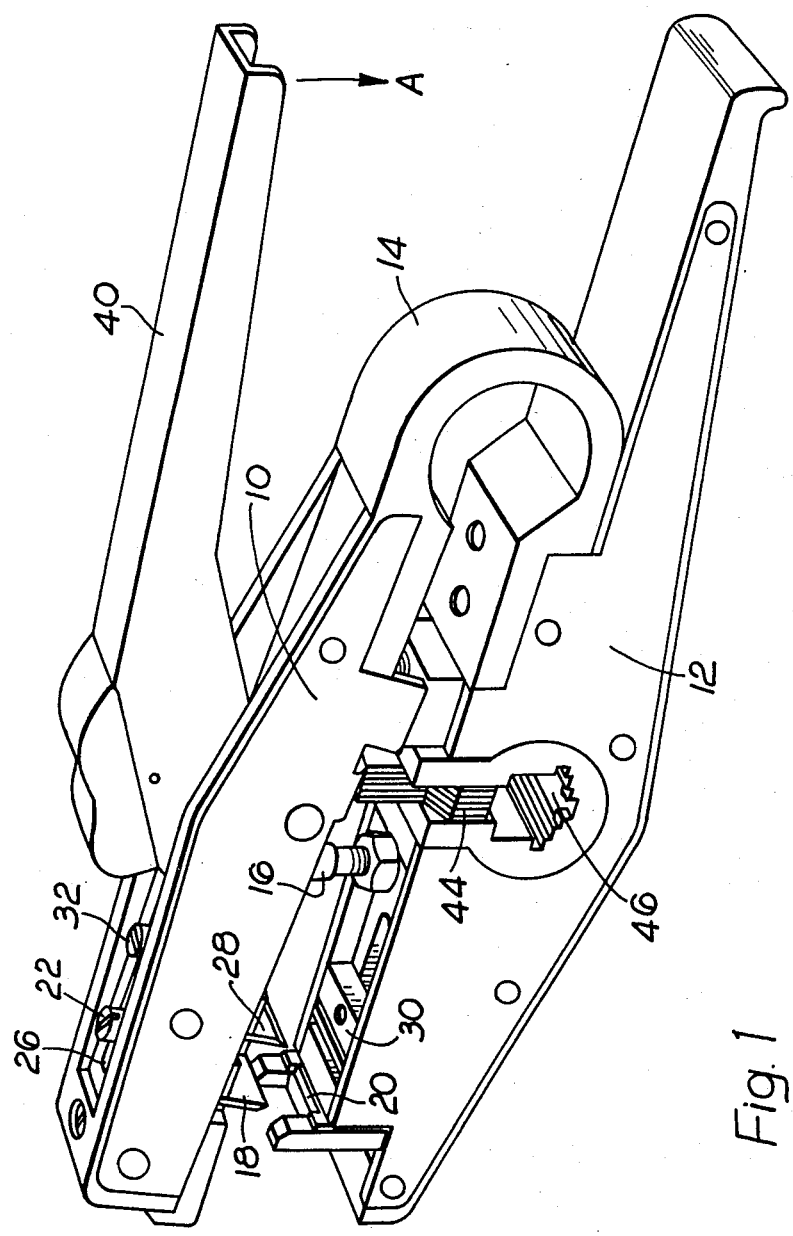

United States Patent [19]

Bieganski

[11] Patent Number: 4,625,386
[45] Date of Patent: Dec. 2, 1986

[54] COMBINATION TOOL

[75] Inventor: Zdzislaw Bieganski, Harpenden, England

[73] Assignee: Abeco Limited, Woburn, England

[21] Appl. No.: 778,988

[22] Filed: Sep. 23, 1985

[30] Foreign Application Priority Data

Oct. 4, 1984 [GB] United Kingdom ................. 8425043

[51] Int. Cl.⁴ ............................................ H01R 43/05
[52] U.S. Cl. ..................... 29/566.4; 29/751;
29/33 M; 7/132; 30/90.1
[58] Field of Search ................... 7/107, 125, 132, 133, 7/134, 900; 30/90.1, 91.2; 72/409, 410; 29/33 M, 566, 566.1, 566.2, 566.3, 566.4, 748, 750, 751

[56] References Cited

U.S. PATENT DOCUMENTS

| | | | |
|---|---|---|---|
| 2,430,383 | 11/1947 | Yager | 72/409 |
| 2,853,722 | 9/1958 | Puzine | 7/132 |
| 3,771,222 | 11/1973 | Sakuma | 7/133 |
| 3,831,207 | 8/1974 | Boyajian | 7/133 |
| 4,429,451 | 2/1984 | Angelico | . |

*Primary Examiner*—Roscoe V. Parker
*Attorney, Agent, or Firm*—C. O. Marshall, Jr.

[57] ABSTRACT

A combination tool is provided (FIG. 1) for carrying out all of the operations necessary to connect a telephone jack to the appropriate cable, by first cutting the cable to the length using cutting blades provided on the tool, and then stripping the insulation sheet from the cable by stripping blades also provided on the tool, subsequently crimping the jack to the cable using a punch and die crimping set also provided on the tool. The tool comprises a pair of parts 10, 12 which are generally parallel to one another and are closed together by a lever 40 using a fulcrum and roller system.

3 Claims, 3 Drawing Figures

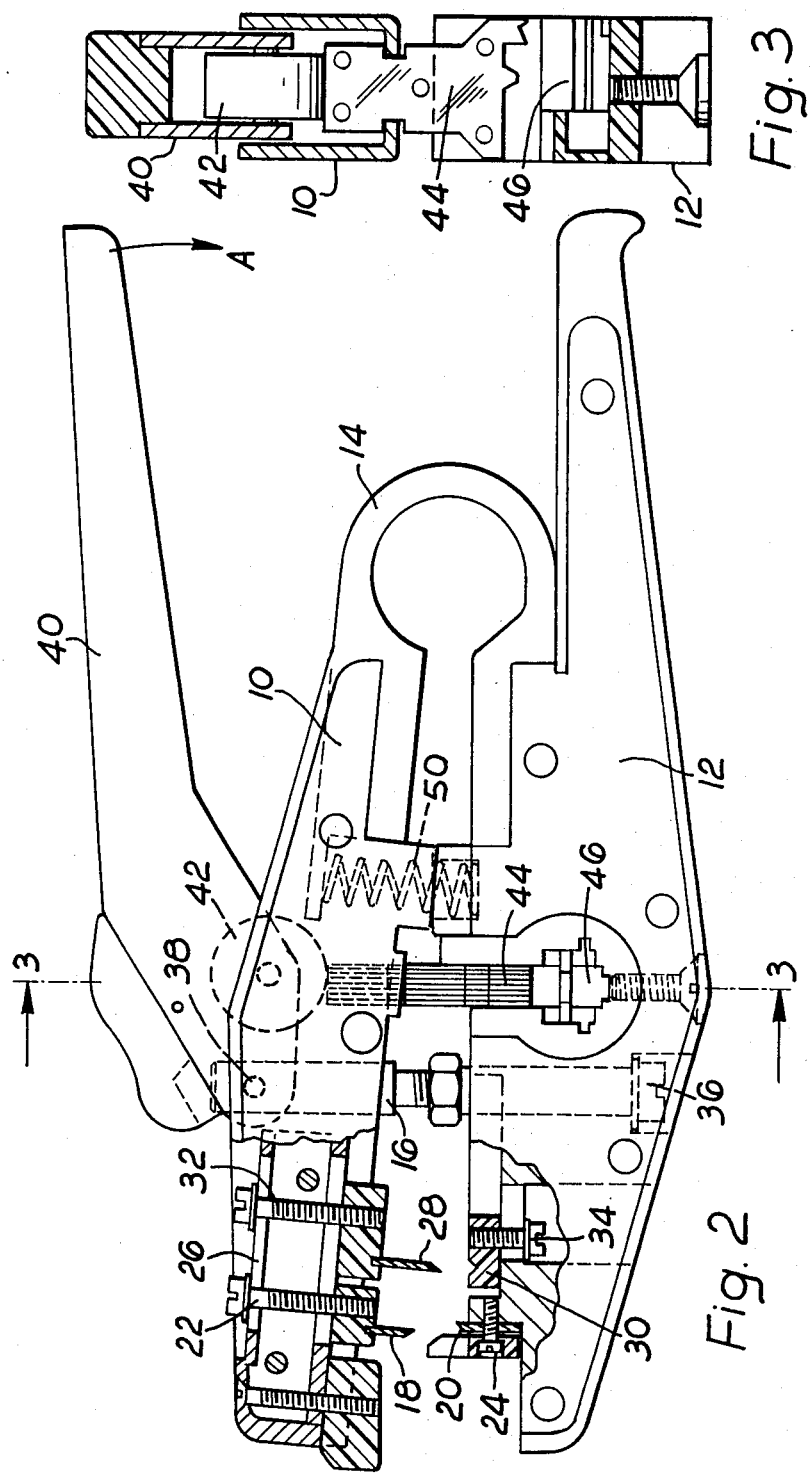

COMBINATION TOOL

A conventional telephone connector jack system uses a plug which is made as a tubular sleeve with one closed end and one open end. An appropriate cable having (say) four individual conductor wires separately insulated, has the axes of the wires contained in a common plane and then collectively enclosed in a single outer insulation sleeve. To connect the plug to the cable, the cable end is cut off square to length, the outer insulation sleeve is cut and stripped leaving a predetermined length of the individual insulated conductors, and then the cut and stripped end is inserted into the plug. The plug is crimped to the cable and terminal pads on the exterior of the plug are connected to the individual conductors by internal pins which are arranged to spike the conductors by an analogous crimping step. These steps need at least three tools.

Many analogous connector plug and cable systems are known also requiring a series of separate tools for connection to be made. The socket may also require a similar tool for connection to its cable.

The object of the invention is to provide a single tool capable of use in such operation.

According to the invention a combination tool comprises a pair of parts which respectively carry stripping blades at a first location, cutting means at a second location and a pair of crimping tools at a third location, with means for guiding the said parts in moving towards and away from one another to effect stripping and crimping operations.

A preferred embodiment is now more particularly described with reference to the accompanying drawings wherein:

FIG. 1 is a perspective view of a combination tool;
FIG. 2 is a side elevation of the same partly in section;
FIG. 3 is a section taken on the line 3—3 of FIG. 2.

Turning now to the drawings, a pair of beam-like parts 10 12 are generally parallel to one another and will be called first and second body parts respectively. The two body parts are connected at one end by a flexible U-shaped portion 14 which maintains the beam parts in relative positions. Midway along the lengths of the beams a guide pin 16 extends in aligned bores in the body parts so as to assist in maintaining the body parts generally parallel to one another in their movement.

At the free ends of the body parts, that is the end opposite to the flexible connection 14 there is provided a pair of stripping blades 18, 20, one on each of the parts. Their shape is such, relative to the shape of the cable to be dealt with, that when the parts 10 12 have been moved together to the maximum possible extent, blades 18 20 will have penetrated a cable positioned between them also to the maximum permissible extent so that if the body parts are held in the closed position and the cable is pulled away from the body parts, outer insulation will be stripped off the cable. The blades may be readily detachable for replacement with different ones appropriate to the desired cable. Thus, in the illustration, blade 18 is held in position by screw 22 and blade 20 is held in position by screw 24. Screw 22 is located in a slot 26, so that the position of the blade 18 can be adjusted. Blade 20 can be spaced appropriately on its body part 12 by the use of packing washers located behind it. Between the stripping blades and the guide pin 16 is one or more severing blades 28. In the illustrated example blade 28 co-operates with anvil 30, and these parts are also held in place by screws 32 34 extending through slots in the body so that the appropriate position can be selected. The intention is to locate the cable between the body parts, being inserted from the free ends towards the pin 16, and then in a single operation of the tool (as hereinafter explained) the cable end can be cut off square and the stripping blades can be caused to penetrate the cable sheath, where upon the cable is pulled out of the tool while the tool is held in the closed position, so as to strip off the outer insulation.

The guide pin 16 is fixed in the body part 12 by means of a screw head 36, and the opposite end of the pin 16 is fulcrummed at 38 to a hand lever 40. The latter is provided with a wheel 42 forming a second fulcrum on a part associated with the body part 10, so that when the handle 40 is moved in the direction of the arrow A towards the integral handle formed on the body part 12, the cutting blades are moved together and pressure is particularly applied by means of the roller 42 onto the abutting part which is a plunger or punch 44. The plunger or punch 44 operates in a guide and co-operates with an anvil 46 so as to form a pair of crimping dies by means of the parts 44 and 46.

The crimping dies may be changed by replacing the part provided with the crimping die recess 46 and replacing the plunger 44.

FIG. 3 shows a typical cross-sectional configuration for the parts 44 46 designed to suit a particular cable termination and fixing operation.

In operation, the prepared cable end (cut to length and stripped to length) is inserted into the plug, and the assembly is inserted into the crimping die 46, and then the lever 40 is operated on a second occasion in the same manner to that when effecting the cutting and stripping, and this time the movement of the crimping plunger in the die effects the required crimping operation of plug terminals to conductor wires.

Spring 50 is trapped between the body parts to provide a return action.

I claim:

1. A combination tool for stripping insulation from a cable and crimping a terminal to the cable, comprising a pair of substantially parallel parts connected together at one end by a member which is flexible to permit relative movement of said parts, a crimping anvil seated on a first one of said parts, a crimping punch which is guided relative to said anvil so as to cooperate with said anvil, a hand lever having a roller which is pivoted intermediate the ends of the lever and bears upon the crimping punch, a pin which has one end fixed in said first one of said parts and has its other end pivoted to one end of said hand lever, each of said parts having at its free end a cutting blade and a stripping blade, fixed in positions which are adjustable longitudinally of said parts, whereby sueezing together said hand lever and said first part actuates said punch and also actuates said cutting and stripping blades.

2. A tool as claimed in claim 1 wherein the cutting and stripping blades are secured by screws in slots which extend longitudinallly in the two substantially parallel parts.

3. A tool as claimed in claim 1 wherein the first one of the two substantially parallel parts has an integral extension which is generally parallel to the hand lever.

* * * * *